United States Patent [19]
Koshikawa et al.

[11] Patent Number: 5,896,243
[45] Date of Patent: Apr. 20, 1999

[54] MAGNETO-RESISTIVE EFFECT TYPE HEAD WITH STEP OR PROTRUSION FOR REDUCING THERMAL ASPERITY

[75] Inventors: Takao Koshikawa; Yoshifumi Mizoshita, both of Kawasaki, Japan

[73] Assignee: Fujitsu Limited, Kawasaki, Japan

[21] Appl. No.: 08/749,103

[22] Filed: Nov. 14, 1996

[30] Foreign Application Priority Data

Apr. 26, 1996 [JP] Japan ................... 8-107773

[51] Int. Cl.⁶ ............... G11B 5/187; G11B 5/255; G11B 5/60
[52] U.S. Cl. ........................ 360/103; 360/122
[58] Field of Search ........................ 360/103, 113, 360/119–122, 126

[56] References Cited

U.S. PATENT DOCUMENTS

| 5,083,365 | 1/1992 | Matsumoto | 360/122 |
|---|---|---|---|
| 5,142,768 | 9/1992 | Aboaf et al. | 360/119 |
| 5,270,895 | 12/1993 | Ruigrok et al. | 360/126 |
| 5,331,494 | 7/1994 | Fukuda et al. | 360/103 |
| 5,351,158 | 9/1994 | Shibata | 360/113 |
| 5,402,295 | 3/1995 | Suzuki et al. | 360/126 |
| 5,430,592 | 7/1995 | Yoda | 360/113 |
| 5,452,166 | 9/1995 | Aylwin et al. | 360/126 |
| 5,455,730 | 10/1995 | Dovek et al. | 360/113 |
| 5,469,312 | 11/1995 | Watanabe et al. | 360/103 |
| 5,508,862 | 4/1996 | Lazzari et al. | 360/103 |
| 5,625,512 | 4/1997 | Smith | 360/103 |
| 5,634,259 | 6/1997 | Sone et al. | 360/103 |
| 5,673,156 | 9/1997 | Chen et al. | 360/103 |

*Primary Examiner*—Jefferson Evans
*Attorney, Agent, or Firm*—Greer, Burns, & Crain, Ltd.

[57] ABSTRACT

To suppress the thermal asperity in the magneto-resistive effect type head for carrying out the reproduction of signals from the recording medium by the element 2 while moving, in a flying or contact state with the recording medium, in a predetermined direction relative to the recording medium. A step 20 or a protrusion 21 which is closer to the recording medium than the element is provided on the air bearing surface of the head in an area on the leading side of the element with respect to the moving direction of the head.

23 Claims, 6 Drawing Sheets

THERMAL ASPERITY (LEADING SIDE) (TRAILING SIDE)

(AIR BEARING SURFACE)

MAGNETO-RESISTIVE EFFECT TYPE HEAD WITH STEP OR PROTRUSION FOR REDUCING THERMAL ASPERITY

BACKGROUND OF THE INVENTION

1. Field of the Invention

The present invention generally relates to a magnetic disk device, particularly to a magneto-resistive effect type head, used for writing/reading information to a recording medium in a magnetic disk device used as an external memory for a computer or the like.

Recently, since the recording density in a magnetic disk device has been more and more increased, a gap between the head and the recording medium has been drastically minimized. Therefore, demand for high performance and high reliability heads, which are operable with a low flying area or a small contact area, has increased.

2. Description of the Related Art

FIGS. 1 and 2 illustrate one example of a known magneto-resistive effect type head used in a magnetic disk drive. FIG. 1 is a perspective view of a slider member of the magneto-resistive effect type head, and FIG. 2 is an enlarged sectional view taken along a line II—II in FIG. 1. In the illustrated head, the slider member 1, made of ceramic material such as $Al_2O_3TiC$ or the like, has a pair of rails $3a$, $3b$, on a surface thereof opposite to a recording medium (not shown). The rail $3a$, $3b$ extend generally parallel to each other from a leading side to a trailing side as seen in a moving direction of the recording medium. A head element 2 is provided on the trailing side of one of the two rails $3a$, $3b$.

As shown in FIG. 2, the head element 2 is located on the trailing side and includes an insulation layer 4 such as $Al_2O_3$ or others similar material and is also covered with a protection layer 5 of an insulating material such as $Al_2O_3$ or other similar material. The head element 2 includes a reading section R wherein a magneto-resistive effect element $2a$ is nipped in a gap portion 9 of an insulating material interposed between a pair of a lower shield layer 7 and an upper shield layer 8 of NiFe or other similar material, and a recording or writing section W including a recording coil 10 and a recording magnetic pole (upper pole) 11. The upper shield layer 8 is used for both the reading secton R and the writing section W. The magneto-resistive effect type element $2a$ is typically a multilayered structure including a magneto-resistive layer, and a bias layer, a magneto-control layer among others, which layers are depicted as a single layer in FIG. 2, for the sake of simplicity.

The magneto-resistive effect type element $2a$ detects the variation of resistance in the element caused by the magnetic field of the recording medium (not shown), and therefore, if there are any projections or foreign matter on the recording medium, there is a risk of collision therewith of part of the head element 2 on the slider member 1. If such a collision occurs, the resistance in the element increases due to the heat generation caused by the collision energy or by friction, which in turn induces the variation of a base line of reproduction signals and is detected as the output variation. This phenomenon is called "thermal asperity" and a typical wave shape of this phenomenon is illustrated in FIG. 3. As is apparent from FIG. 3, the base line of the reproduction signals largely varies due to a rapid temperature rise in the element. As the flying height of the slider member 1 is reduced, the probability of collision of the slider member with the projections or foreign matter on the recording medium increases. Thereby, to realize high-density recording, it is important to suppress the probability of such a collision. In this regard, thermal asperity is discussed, for example, in "Magneto-Resistive Head Thermal Asperity Digital Compensation"; R. L. Galbraith; G. J. Kerwin; J. M. Poss; IEEE Trans. on Mag., Vol. 28, No. 5, 1992.

SUMMARY OF THE INVENTION

The above problem can be solved by positively making the projections or foreign matter on the recording medium, which may strike the element section of the slider member, impinge upon another part of the slider member.

FIG. 4 shows the calculated results of the difference in temperature rise in the element between various states of collision of the projections or foreign matter with the magneto-resistive effect type head element, wherein (a) is when the collision occurs in an area in the vicinity of the magneto-resistive effect type head element $2a$ including the shield layers 7, 8 and the gap portion 9, (b) is when no collision occurs in an area including the shield layers 7, 8 and the gap portion 9, and (c) is when no collision occurs in a wider area including the shield layers 7, 8 as well as the area within 3 µm outside the shield layers 7, 8.

As understood from FIG. 4, (b) has a smaller temperature rise than (a) but the rise angle is still steep, which is detected as a thermal asperity in the signal wave shape (obtained by regeneration of the variation of signal voltage due to the temperature variation high-pass filter). On the other hand, in (c), it is apparent that the temperature rise in the magneto-resistive effect type element $2a$ is almost negligible.

As described above, it will be understood that thermal asperity can be suppressed by forming a step or a protrusion on the leading side of the slider member so that the projections or the foreign matter on the recording medium do not collide with the area in the vicinity of the shield layers 7, 8 including the magneto-resistive effect element $2a$ and the gap portion 9.

Accordingly, according to the present invention, a magneto-resistive effect type head comprising a magneto-resistive effect type element located on an air bearing surface thereof opposite to a recording medium, wherein the magneto-resistive effect type head carries out the reproduction of signals from the recording medium via the element while moving, in a flying or contact state with respect to the recording medium, in a predetermined direction relative to the recording medium, is characterized in that a step or a protrusion which is closer to the recording medium than the element is provided on the air bearing surface of the head in an area on the leading side of the movement of the head.

The head comprises a slider member and the above-mentioned element attached directly or via an insulation layer to the trailing end of the slider member. The slider member is made of a ceramic material which is a mixture of $Al_2O_3$ and TiC. The insulation layer between the slider member and the head element is made of alumina ($Al_2O_3$) or silicon oxide ($SiO_2$).

According to one embodiment of the present invention, the head comprises a slider member and the above-mentioned element attached via an insulation layer to the trailing end of the slider member, wherein the step is provided on the air bearing surface on the boundary between the slider member and the insulation layer.

In the above embodiment, the insulation layer between the slider member and the head element has a thickness of 5 µgm or less. The step is formed by abrading the air bearing surface of the slider member.

According to another embodiment, the protrusion is formed on the air bearing surface of the slider member or that of the insulation layer provided between the slider member and the head element. The protrusion has a wider width than that of a track as seen in the track-width direction. The protrusion is made of carbon or carbides.

According to further embodiment, the head has a structure wherein the head element is located in a read gap formed between shield layers attached to the slider member via the insulation layer, characterized in that the shield layer or the insulation layer in the vicinity of the shield layer is recessed in an area around the head element relative to the air bearing surface. The recess has a width wider than that of the track as seen in the track-width direction.

Thus, it is possible, by positively making the projections or the foreign matter on the recording medium collide with a portion of the sliding member other than in the vicinity of the head element, to avoid collisions with the head element itself or a portion in the vicinity of the head element, whereby thermal asperity can be suppressed

DETAILED DESCRIPTION OF THE EMBODIMENTS

Figure 1:
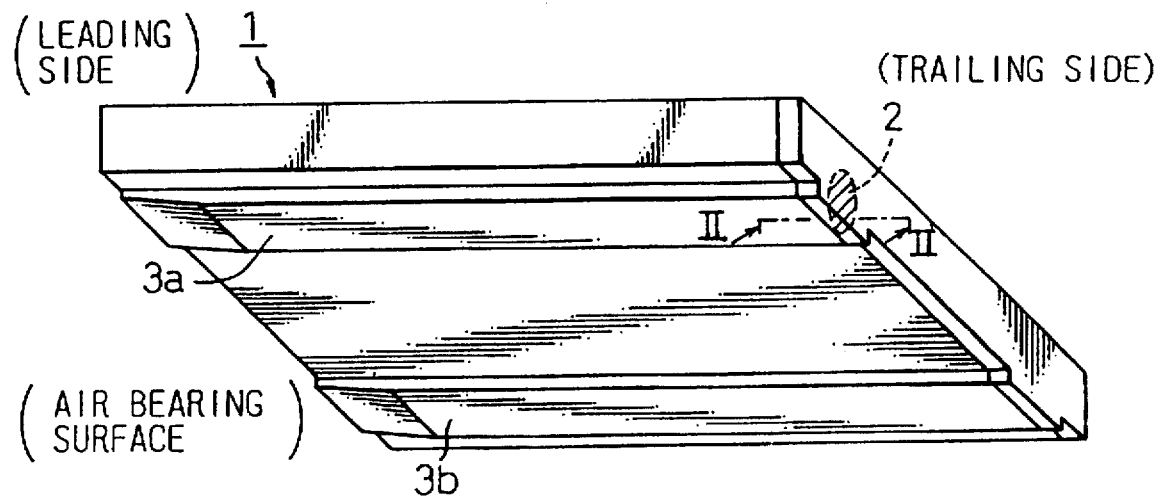
FIG. 1 is a perspective view of a prior art magneto-resistive effect type head slider.
Figure 2:
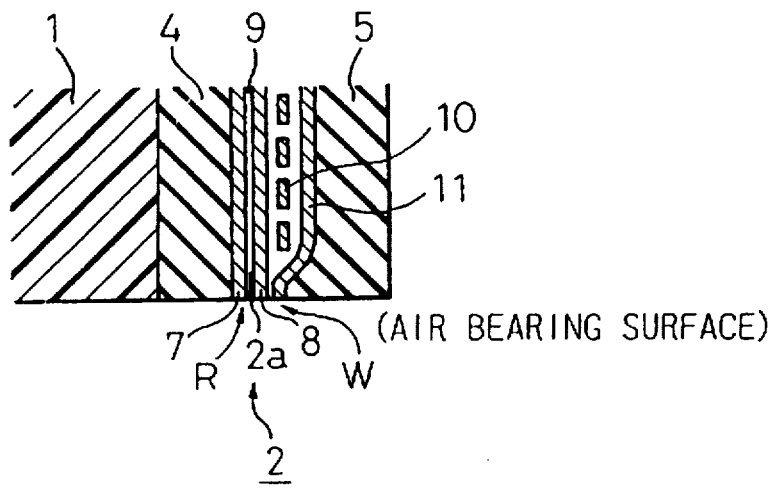
FIG. 2 is a sectional view take along line II—II in FIG. 1, showing a structure including the prior art magneto-resistive effect type head element and parts therearound.
Figure 3:
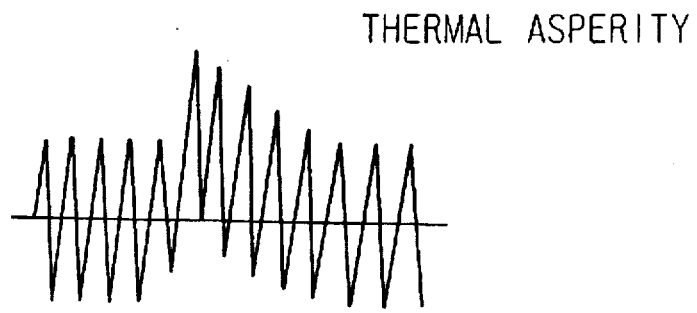
FIG. 3 shows one typical example of the thermal asperity.
Figure 4:
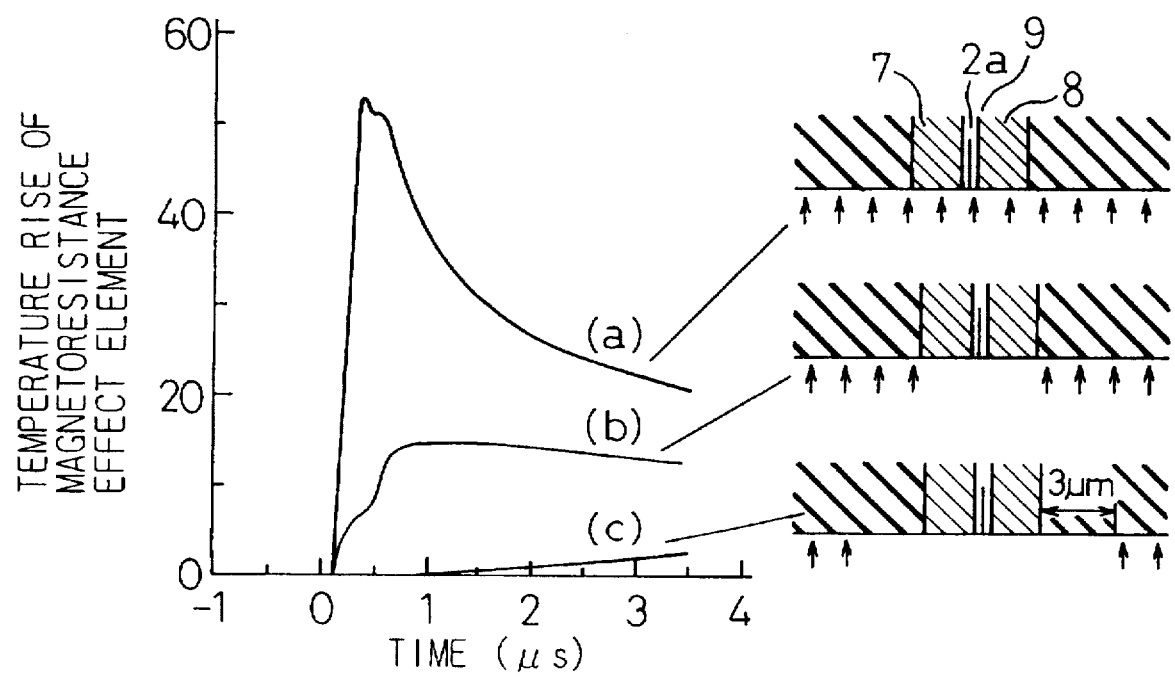
FIG. 4 shows graphs illustrating the difference in the temperature rise in the element due to the difference in the collision state of the magneto-resistive effect type head element with projections or foreign matter.

The present invention will now be described below in more detail with reference to the preferred embodiments illustrated in FIGS. 5 through 7.

In these drawings, reference numeral 1 denotes a slider member made of a ceramic material which is a mixture of alumina ($Al_2O_3$) and titanium carbide (TiC); 2a, a magneto-resistive effect type head element; 4, an insulation layer made of alumina ($Al_2O_3$); 5, a protection layer made of an insulating material such as alumina ($Al_2O_3$); 7, a lower shield layer made of nickel/iron alloy (Ni—Fe) or the like; 8, an upper shield layer also made of nickel/iron alloy (Ni—Fe) or the like; and 9, a gap layer made of an insulating material. The writing section is not shown in these drawings.

Figure 5:
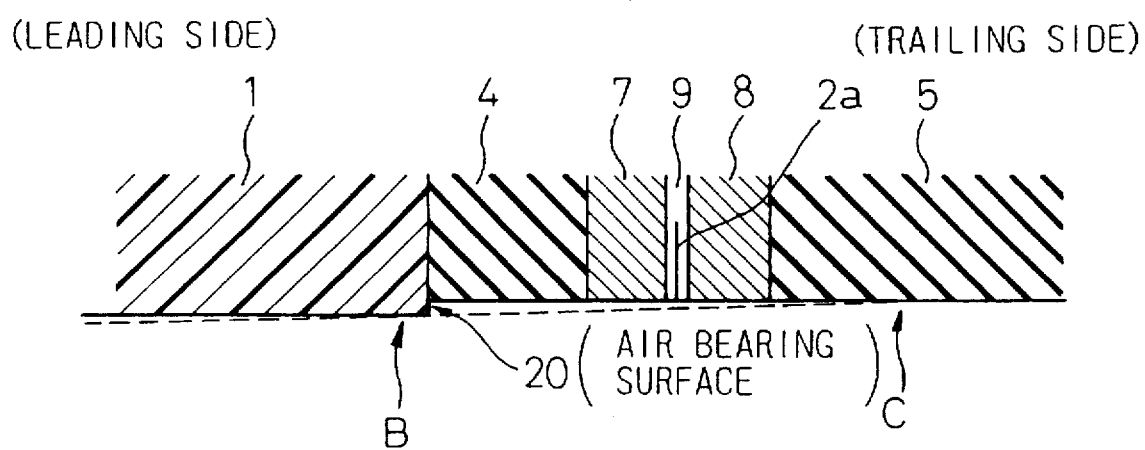
FIG. 5 is a sectional view of a main portion of a magneto-resistive effect type head according to a first embodiment of the present invention.

FIG. 5 illustrates a first embodiment of the present invention wherein a step 20 is provided on the boundary between $Al_2O_3$—TiC forming the slider member 1 and $Al_2O_3$ forming the insulation layer 4, extending in the transverse direction to the track, i.e., in the direction perpendicular to the moving direction of the recording medium (not shown), so that the slider member side on the boundary surface is closer to the recording medium (not shown). Since $Al_2O_3$—TiC forming the slider member 1 is harder than $Al_2O_3$ forming the insulation layer 4, the step 20 can easily be formed when the air bearing surface of the slider member 1 is machined.

The height of the step is determined while taking various factors into consideration, such as the flying posture of the slider member 1, and the thickness of the insulation layer 4 formed of $Al_2O_3$. If the height of the step is unnecessarily large, the flying height of the magneto-resistive effect type element 2a increases and deteriorates the reproduction characteristic, although the adverse effect from the projections or foreign matter on the recording medium is avoided. Therefore, it is necessary to select the optimum height. The optimum height x of the step should be in a range defined by the following equation:

$$x \geq (t+s) \tan \theta$$

wherein t is the thickness of the insulation layer, s is the thickness of the head including the shield layers and θ is the flying angle. Preferably, (t+s) is as small as possible if the dynamic behavior of the slider is taken into consideration. For example, the step 20 of 3 ηm height is capable of avoiding the collision in a length of 17 μm when the flying angle of the slider member 1 is 0.01 degree, which means that the collision in a length of 14 μm including the shield layer 7 can be prevented, if the insulation layer 4 of $Al_2O_3$ between the slider member 1 and the shield layer 7 has a thickness of 3 μm.

Figure 6A:
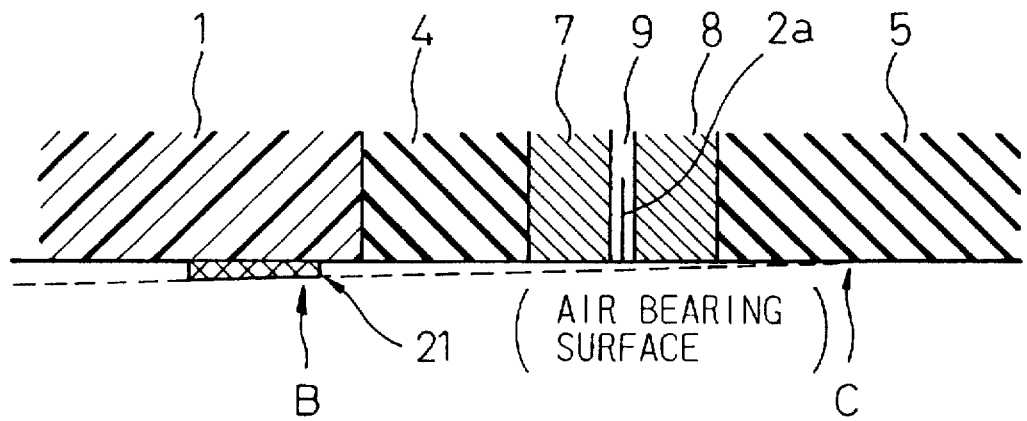
FIG. 6(a) is a sectional view of a main portion of a magneto-resistive effect type head according to a second embodiment of the present invention.
Figure 6B:
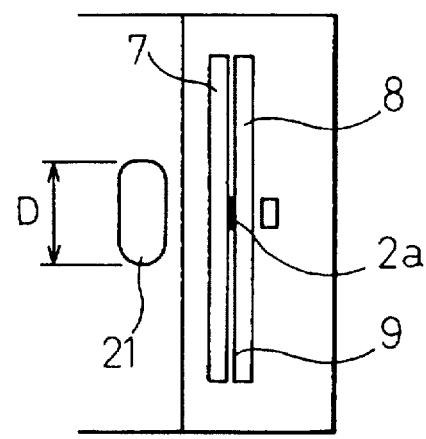
FIG. 6(b) is a bottom view of the second embodiment as seen from the recording medium.

FIG. 6(a) illustrates a second embodiment of the present invention, wherein a difference in level is provided on the leading side of the element on the air bearing surface by forming a protrusion 21 on the leading side of the element. The protrusion 21 can be formed, for example, by providing a carbon film on the air bearing surface and patterning the same in the conventional manner. In this regard, the protrusion 21 on the air bearing surface may extend all over the width of the shield layer 7 in the track width direction, but also may be formed at least in a limited range D, provided that it can sufficiently cover the track width area, as shown in FIG. 6(b).

Figure 7A:
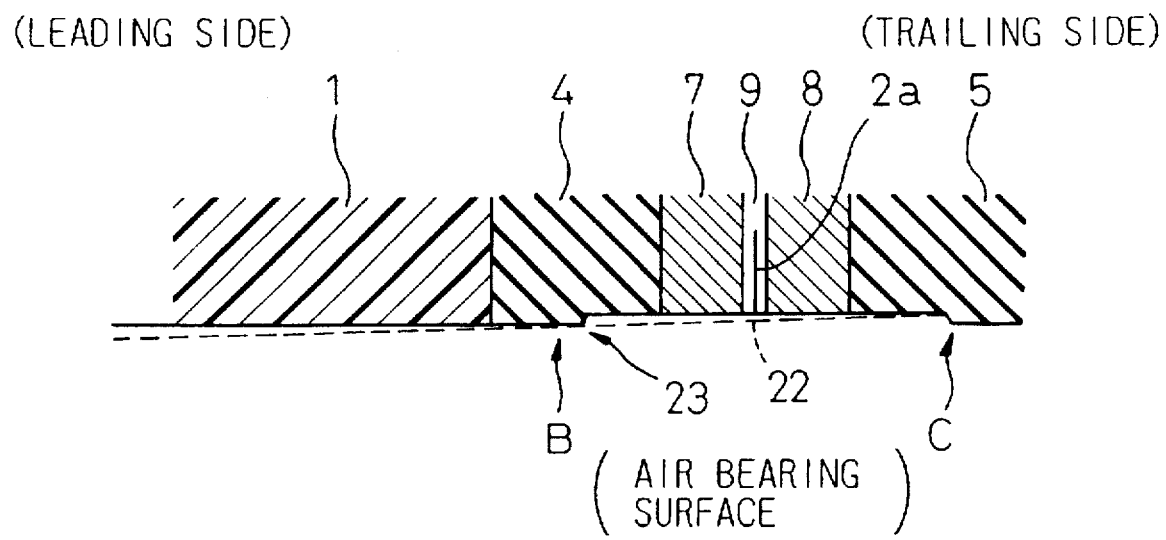
FIG. 7(a) is a sectional view of a main portion of a magneto-resistive effect type head according to a third embodiment of the present invention.
Figure 7B:
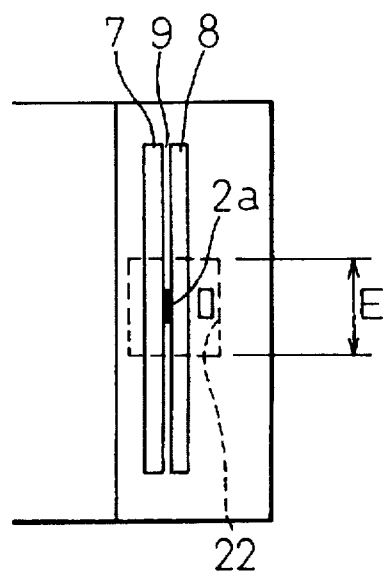
FIG. 7(b) is a bottom view of the second embodiment as seen from the recording medium.

FIG. 7(a) illustrates a third embodiment of the present invention, wherein a recess 22 of a predetermined depth is formed on the air bearing surface in an area in the vicinity of the shield layer 7 including the latter. The depth of the recess 22 is in a range between about 2 and 5 ηm. The recess 22 may be provided by a conventional etching technology such as ion milling or reactive ion etching conducted on a photoresist mask formed on the air bearing surface after the latter has been prepared. Similarly to the second embodiment, the recess 22 may be provided so as to extend the full width of the head, but also may be formed at least in a limited range E, provided that it can sufficiently cover the track width area, as shown in FIG. 7(b). In this regard, it is better that the recess 22 is deeper on the leading side and shallower on the trailing side so that a step 23 is defined at the leading end thereof.

In the above embodiments, if there are projections or foreign matter on the recording medium (not shown) when the recording medium spins, these projections or foreign matter are initially brought into contact with the step or the protrusion at position B, and then with point C on the trailing side from the magneto-resistive effect type head element 2a, whereby there are no adverse effects on the head element itself. Accordingly, thermal asperity does not occur.

Figure 8:
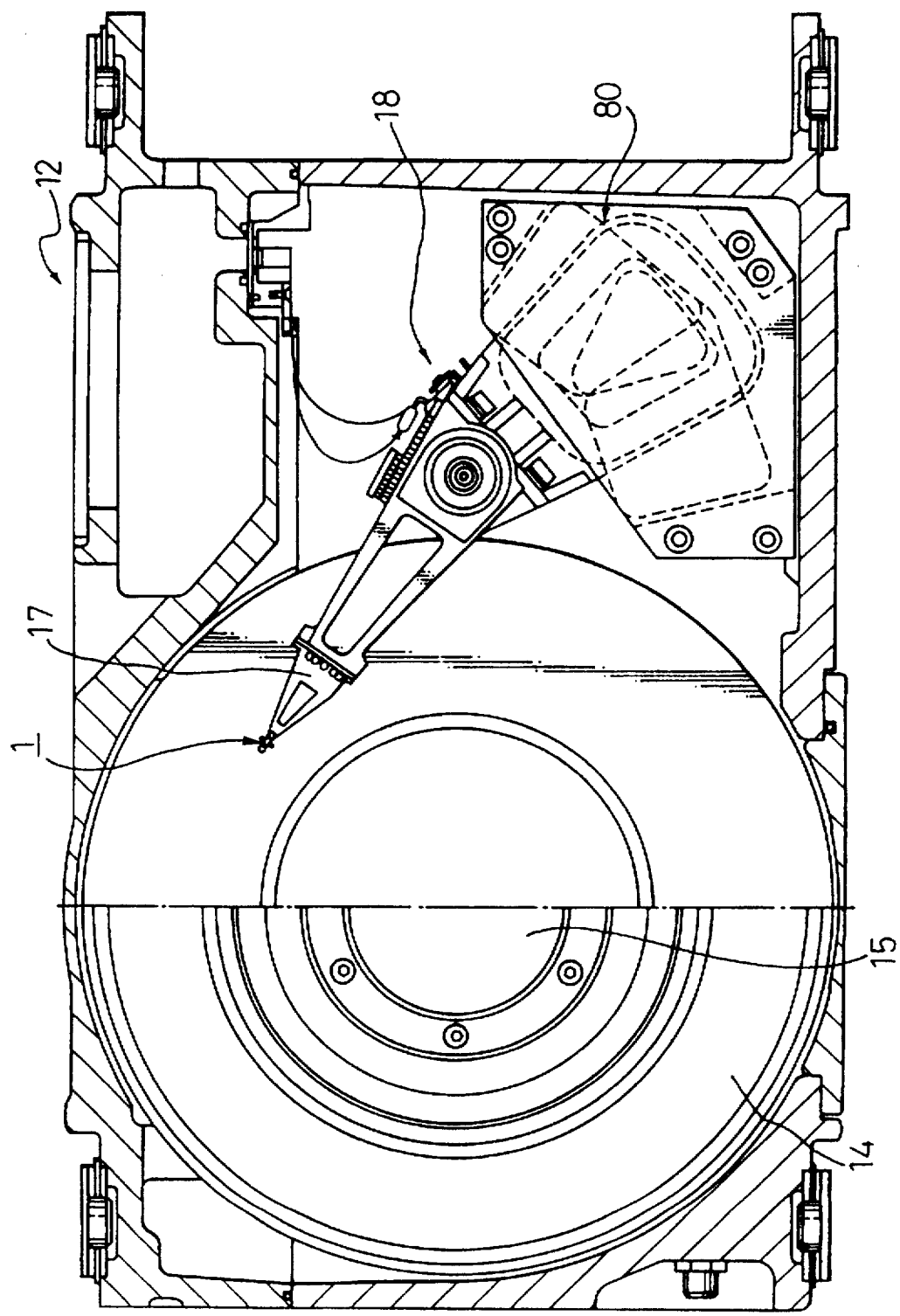
FIG. 8 is a plan view of a magnetic disk apparatus in which a magnetro-resistive effect type head element of this invention can be used.

FIG. 8 is a plan view of a magnetic disk device in which the magnetro-resistive effect type head in the respective embodiments shown in FIGS. 5 through 7 can advantageously be employed. In FIG. 8, the reference numeral 1 denotes a magnetro-resistive effect type head; 12, an enclosure of the magnetro disk device; 14, a disk; 15, a spindle; 17, a spring arm; 18, a carriage; and 80, a voice coil motor, as generally known in the art.

As described hereinbefore, according to the present invention, it is possible to provide a magnetic head capable of ensuring a favorable reproduction characteristic while avoiding the occurrence of thermal asperity due to the collision between a magneto-resistive effect type head element and projections or foreign matter which may be present on a recording medium, by forming a step or a protrusion on the leading side from the magneto-resistive effect type head element on the air bearing surface.

It will be understood by those skilled in the art that the foregoing description relates to only some preferred embodiments of the disclosed invention, and that various changes and modifications may be made to the invention without departing from the spirit and scope thereof.

What we claim is:

1. A magneto-resistive effect type head including an air bearing surface configured to oppose a recording medium, said magneto-resistive effect type head comprising:

a slider body having a leading end and a trailing end, and defining a thin film forming surface at the trailing end;

an insulation layer formed on said thin film forming surface, wherein said insulation layer is adjacent to said slider body and defines a boundary therebetween, said boundary separating a first surface extending from said boundary to said leading edge of said slider body and a second surface extending from said boundary away from said leading edge to a distal end of said magneto-resistive effect type head, and wherein said second surface is a substantially planar surface;

a magneto-resistive element formed in said insulation layer; and a step provided in said air bearing surface at the boundary or on said first surface near the boundary.

2. The magneto-resistive effect type head as defined in claim 1 wherein said step is located at said boundary, and further wherein said step indents said magneto-resistive element from said air bearing surface.

3. The magneto-resistive effect type head as defined in claim 1 wherein step is a protrusion that extends downwardly from said air bearing surface, and further wherein said protrusion shields said magneto-resistive element from projections or foreign matter that may be found on the surface of the recording medium.

4. The magneto-resistive effect type head as defined in claim 3 and further comprising:

a write head element having a width approximately defining a track width; and wherein said protrusion has a width that is wider than the width of said write head element.

5. The magneto-resistive effect type head as defined in claim 4 wherein said with of said protrusion is narrower than an overall width of said magneto-resist effect type head.

6. The magneto-resistive effect type head as defined in claim 3 wherein said protrusion is comprised of a material chosen from one of the following materials: carbon and carbides.

7. The magneto-resistive effect type head as defined in claim 1 wherein said step of is a height (x) of the range defined by the formula: $x \geq (t+s) \tan \theta$, where t is the thickness of the insulation layer, s is the thickness of the head, and $\theta$ is the flying angle.

8. The magneto-resistive effect type head as defined in claim 1 wherein said slider body is comprised of a ceramic material that is a mixture of $Al_2O_3$ and TiC.

9. The magneto-resistive effect type head as defined in claim 1 wherein said insulation layer has a thickness of less than or equal to approximately 5 µm.

10. The magneto-resistive effect type head as defined in claim 1 wherein said step is formed by abrading said insulation layer and said magneto-resistive element from said air bearing surface.

11. The magneto-resistive effect type head as defined in claim 1 wherein said insulation layer is comprised of a material chosen from one of the following materials: $Al_2O_3$ and $SiO_2$.

12. A magneto-resistive effect type head including an air bearing surface configured to oppose a recording medium, said magneto-resistive effect type head comprising:

a slider body having a leading end and a trailing end, and defining a thin film forming surface at the trailing end;

an insulation layer formed in said thin film forming surface, wherein said insulation layer is adjacent to said slider body and defines a boundary therebetween;

a magneto-resistive element formed on said insulation layer; and a single step provided in said air bearing surface at or immediately adjacent the boundary between said slider body and said insulation layer for indenting said magneto-resistive element from said air bearing surface, wherein said single step is the only significant discontinuity along an otherwise substantially planar surface.

13. The magneto-resistive effect type head as defined in claim 12 wherein said slider body is comprised of a ceramic material that is a mixture of $Al_2O_3$ and TiC.

14. The magneto-resistive effect type head as defined in claim 12 wherein said insulation layer has a thickness of less than or equal to approximately 5 µm.

15. The magneto-resistive effect type head as defined in claim 12 wherein said step is formed by abrading said insulation layer and said magneto-resistive element from said air bearing surface.

16. The magneto-resistive effect type head as defined in claim 12 wherein said insulation layer is comprised of a material chosen from one of the following materials: $Al_2O_3$ and $SiO_2$.

17. The magneto-resistive effect type head as defined in claim 12 wherein said step of is a height (x) of the range defined by the formula: $x \geq (t+s) \tan \theta$, where t is the thickness of the insulation layer, s is the thickness of the head, and $\theta$ is the flying angle.

18. A magneto-resistive effect type head including an air bearing surface configured to oppose a recording medium, said magneto-resistive effect type head comprising:

a slider body having a leading end and a trailing end, and defining a thin film forming surface at the trailing end;

an insulation layer formed on said thin film forming surface, wherein said insulation layer is adjacent to said slider body and defines a boundary therebetween;

a magneto-resistive element formed on said insulation layer; and a step provided on said air bearing surface at the boundary between said slider body and said insulation layer for indenting said magneto-resistive element from said air bearing surface.

19. The magneto-resistive effect type head as defined in claim 18 wherein said slider body is comprised of a ceramic material that is a mixture of $Al_2O_3$ and TiC.

20. The magneto-resistive effect type head as defined in claim 18 wherein said insulation layer has a thickness of less than or equal to approximately 5 μm.

21. The magneto-resistive effect type head as defined in claim 18 wherein said step is formed by abrading said insulation layer and said magneto-resistive element from said air bearing surface.

22. The magneto-resistive effect type head as defined in claim 18 wherein said insulation layer is comprised of a material chosen from one of the following materials: $Al_2O_3$ and $SiO_2$.

23. The magneto-resistive effect type head as defined in claim 18 wherein said step of is a height (x) of the range defined by the formula: $x \geq (t+s) \tan \theta$, where t is the thickness of the insulation layer, s is the thickness of the head, and θ is the flying angle.

* * * * *

UNITED STATES PATENT AND TRADEMARK OFFICE
CERTIFICATE OF CORRECTION

PATENT NO. : 5,896,243  
DATED : April 20, 1999  
INVENTOR(S) : Koshikawa et al.

Page 1 of 2

It is certified that error appears in the above-identified patent and that said Letters Patent is hereby corrected as shown below:

On the title page,

Under "[57] Abstract" delete the first sentence and insert --A magneto-resistive effect type head is provided to suppress the thermal asperity caused by projections or foreign matter found on the recording medium.-- therefor Under "[57] Abstract" in line 6, delete "20" and "21"

Column 1, line 27, delete ","

UNITED STATES PATENT AND TRADEMARK OFFICE
CERTIFICATE OF CORRECTION

PATENT NO. : 5,896,243
DATED : April 20, 1999
INVENTOR(S) : Koshikawa et al.

It is certified that error appears in the above-identified patent and that said Letters Patent is hereby corrected as shown below:

Column 1, line 34, delete "others and insert

--other-- therefor

Column 1, line 46, delete "and" then after "bias layer," insert -- and --

Column 2, line 64, delete "μgm" and insert

--μm-- therefor

Signed and Sealed this

Twenty-third Day of May, 2000

Attest:

Q. TODD DICKINSON

*Attesting Officer*    *Director of Patents and Trademarks*